United States Patent [19]

Datta et al.

[11] 4,455,335
[45] Jun. 19, 1984

[54] HIGH DENSITY INFORMATION DISC LUBRICANTS

[75] Inventors: Pabitra Datta, Cranbury; Eugene S. Poliniak, Willingboro, both of N.J.

[73] Assignee: RCA Corporation, New York, N.Y.

[21] Appl. No.: 468,586

[22] Filed: Feb. 22, 1983

[51] Int. Cl.$^3$ ............................ G11B 3/70; B32B 3/02
[52] U.S. Cl. ........................................ 428/64; 428/65; 428/518; 428/523; 346/135.1; 369/276; 369/286; 369/288; 252/11
[58] Field of Search .................. 428/64, 65, 523, 518; 346/135.1; 369/276, 286, 288; 252/11

[56] References Cited

U.S. PATENT DOCUMENTS

| | | | |
|---|---|---|---|
| 4,327,140 | 4/1982 | Preston | 428/65 |
| 4,330,583 | 5/1982 | Datta et al. | 428/65 |
| 4,340,629 | 7/1982 | Hillenbrand et al. | 428/64 |
| 4,342,660 | 8/1982 | Berry et al. | 252/49.6 |
| 4,346,468 | 8/1982 | Preston et al. | 369/276 |
| 4,346,469 | 8/1982 | Hillenbrand et al. | 369/276 |
| 4,351,048 | 9/1982 | Berry | 369/288 |
| 4,355,062 | 10/1982 | Wang et al. | 428/64 |

OTHER PUBLICATIONS

William F. Nye, Inc., P.O. Box G–927, New Bedford, Mass. 02742, Sep. 1973; Bulletin 7307, "Synthetic Hydrocarbon."

Primary Examiner—Alexander Thomas
Attorney, Agent, or Firm—Birgit E. Morris

[57] ABSTRACT

Capacitance electronic discs comprising conductive carbon-loaded PVC records are lubricated with a long chain polyalkylethylene lubricant containing 9-phenylstearyl alcohol as a dopant in an amount sufficient to reduce the moisture sensitivity of the discs.

3 Claims, No Drawings

HIGH DENSITY INFORMATION DISC LUBRICANTS

This invention relates to improved lubricants for capacitance electronic discs. More particularly, this invention relates to an improved lubricant additive which improves moisture resistance of these discs.

BACKGROUND OF THE INVENTION

Copending application to Datta et al, Ser. No. 344,534 filed Feb. 1, 1982 now U.S. Pat. No. 4,410,748, herein incorporated by reference, discloses a class of lubricants for capacitance electronic discs, which are made of a conductive carbon-containing PVC, which comprises a polyalkylethylene lubricant containing polar additives or dopants such as hydroxylated amines, betaines and bis(hydroxyalkyl)dialkyldisiloxanes. Mixtures of dopants can also be employed.

It would be desirable to have additional dopant additives available that will be effective on both cleaned and on as-pressed discs and thus the search for effective additives has continued.

SUMMARY OF THE INVENTION

We have found that 9-phenylstearyl alcohol, when added to polyalkylethylene lubricants, is effective to reduce the sensitivity of the discs to moisture with no adverse effects on environmental stability of the discs.

DETAILED DESCRIPTION OF THE INVENTION

9-Phenylstearyl alcohol has the formula

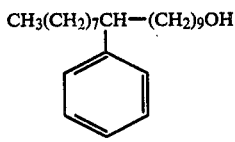

It is a liquid at room temperature. An effective amount of 9-phenylstearyl alcohol is added to a hydrocarbon lubricant of the formula

wherein R is a long chain alkyl group of 4–20 carbon atoms, preferably at least 8 carbon atoms, and n is an integer.

The above described hydrocarbon lubricant is combined with the 9-phenylstearyl alcohol, which alcohol has both a polar group and a long chain pendent alkyl group. Preferably, the mixture contains from about 5 to about 40 percent by weight of the 9-phenylstearyl alcohol.

The dopant can be mixed with the hydrocarbon lubricant in a solvent or solvent mixture, for example, heptane or a heptane-isopropanol mixture in which the components are soluble. The solution can be sprayed onto a high density information record in known manner, or the record can be immersed in the solution. Alternatively, the doped lubricant can be applied directly by means of a very fine nozzle.

The discs have improved resistance to the effects of elevated temperature and moisture and the lubrication is sufficient to prevent undue stylus wear.

The lubricant system of the present invention can be applied to capacitance electronic discs as they are pressed from the mold, which is preferable, or the discs can be cleaned first with an aqueous solution and then dried with a solvent such as 1,1,2-trifluoro-2,2,1-trichloroethane.

The invention will be further illustrated by the following Examples but the invention is not meant to be limited to the details described therein. In the Examples, parts and percentages are by weight unless otherwise noted.

Carrier distress time is measured by adding the amount of time in seconds (but discounting intervals of less than 10 microseconds) during record playback when the r.f. output of the player arm is less than 150 millivolts peak to peak and the time when the r.f. output gives above 8.6 or below 3.1 megahertz in frequency, indicating a defect. Such defects are noted by the viewer as dropouts. The present acceptable level of carrier distress for a video record is 3 seconds in one hour of playback time.

Another test of the disc is known as the small skips test. The r.f. output of the player arm normally detects 8 consecutively numbered daxi codes for each rotation of the disc. Thus, if less than 8 daxi codes are noted per rotation, a computer attached to the player determines the number of daxi codes missed and then computes the number of grooves skipped. The number of times during one hour of playback that 8 grooves or less are skipped (one small skip event) is monitored. The present acceptable level of small skip events is 30 for one hour or 15 for one-half hour of playback.

EXAMPLE 1

Commercial capacitance electronic discs were used for testing. One group of discs was cleaned in Shipley cleaning solution as disclosed in copending application of Nyman et al, Ser. No. 091,878 filed Nov. 7, 1979, and dried in trifluorotrichloroethane and lubricated. The second group of discs was lubricated as they came from the press.

The lubricants were sprayed in all cases from heptane solution.

The discs were played once and stressed by placing in a chamber maintained at 95 percent relative humidity and 100 F for one hour and played again. Carrier distress was measured during each play.

The data are summarized below wherein the Control lubricant contains no additives and the Example was applied from heptane solution containing 0.3 percent of a polydecylethylene lubricant available as H-180 from NYE Inc. and 0.045 percent of 9-phenylstearyl alcohol.

|  | Carrier Distress, secs./hr | | |
|---|---|---|---|
|  | Range | Median | # Pass |
| Washed Discs | Initial Play | | |
| Control | 0.1–1.5 | 0.1 | 12/12 |
| Example 1 | 0–0.5 | 0.1 | 12/12 |
|  | After Stressing | | |
| Control | 0.1–7.3 | 1.7 | 9/12 |
| Example 1 | 0.1–1.0 | 0.2 | 12/12 |
| As Pressed Discs | Initial Play | | |

EXAMPLE 2

Discs as in Example 1 were tested for short skips. The data are summarized below.

| | Short Skips/30 min. Playback | |
|---|---|---|
| | Range | Median |
| Washed Discs | Initial Play | |
| Control | 0–50 | 5 |
| Example 2 | 0–19 | 4 |
| | After Stressing | |
| Control | 6–694 | 25 |
| Example 2 | 0–44 | 4 |
| As Pressed Discs | Initial Play | |
| Control | 0–67 | 11 |

-continued

| | Carrier Distress, secs./hr | | |
|---|---|---|---|
| | Range | Median | # Pass |
| Control | 0.1–1.4 | 0.1 | 12/12 |
| Example 1 | 0.1–0.4 | 0.1 | 12/12 |
| | After Stressing | | |
| Control | 0.1–16 | 6.5 | 4/12 |
| Example 1 | 0.1–3.1 | 0.3 | 11/12 |

-continued

| | Short Skips/30 min. Playback | |
|---|---|---|
| | Range | Median |
| Example 2 | 0–40 | 8 |
| | After Stressing | |
| Control | 5–90 | 21 |
| Example 2 | 0–50 | 8 |

It is apparent that the doped lubricant performed well in all cases as compared to the undoped lubricant.

We claim:

1. In a capacitance electronic disc having a lubricat layer thereon composed of a polyalkylethylene lubricant of the formula

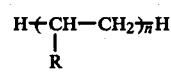

wherein R is alkyl of 4 to 20 carbon atoms and n is an integer, the improvement wherein a polar additive, 9-phenylstearyl alcohol, is added to said lubricant in an amount effective to reduce the moisture sensitivity of the disc.

2. A disc according to claim 1 wherein R is an alkyl group of 8 or more carbon atoms.

3. A disc according to claim 1 wherein said lubricant contains from 5 to 40 percent by weight of 9-phenylstearyl alcohol.

* * * * *